Jan. 30, 1968 P. OSTROSKY 3,365,996
COTTER PIN
Filed May 11, 1966 2 Sheets-Sheet 1
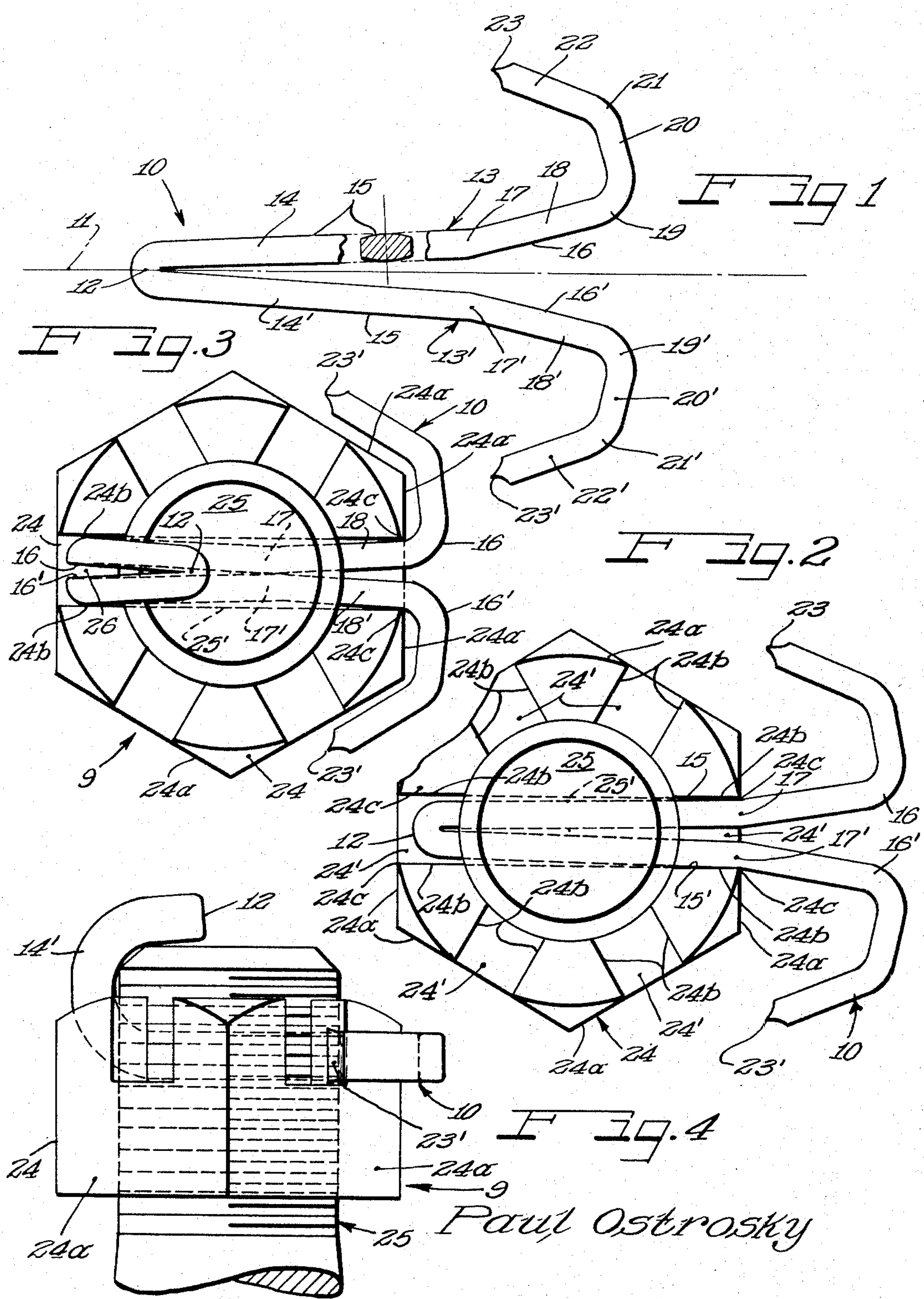

COTTER PIN
Filed May 11, 1966 2 Sheets-Sheet 2
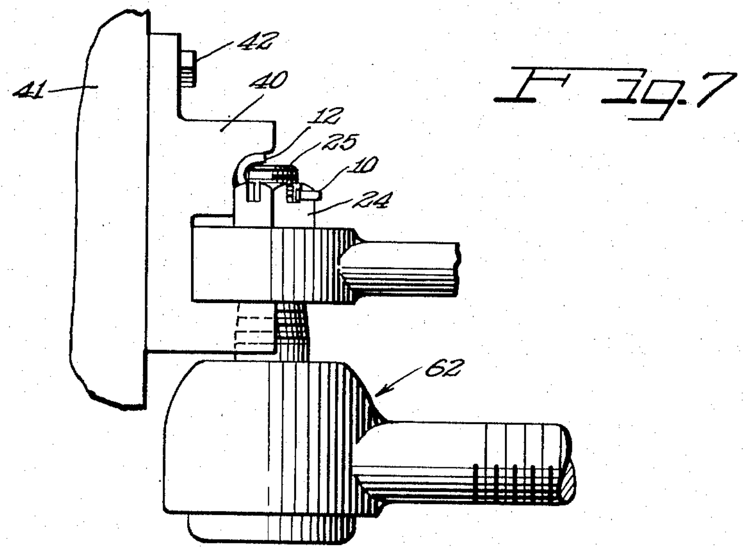
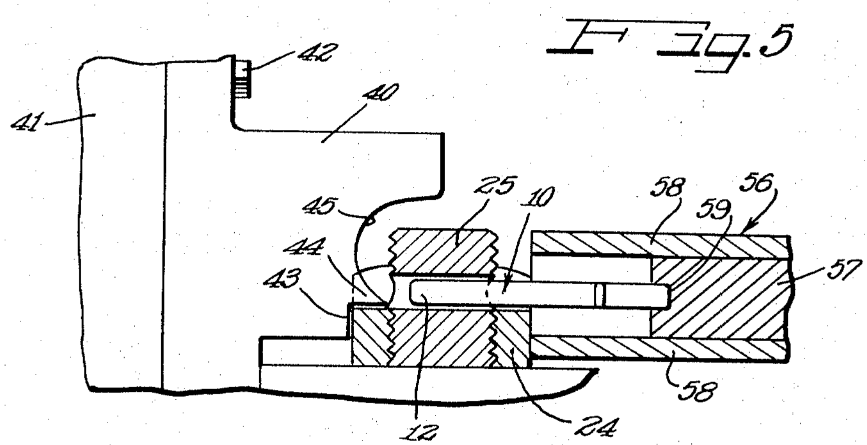
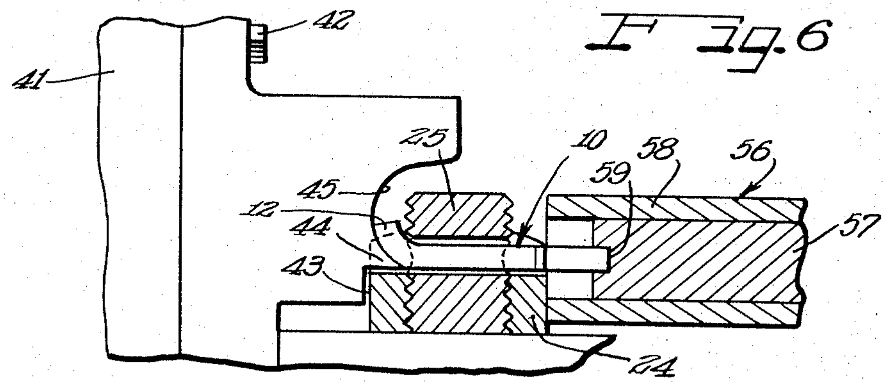
Paul Ostrosky
BY Hill, Sherman, Meroni, Gross & Simpson 3,365,996

COTTER PIN

Paul Ostrosky, Detroit, Mich., assignor to TRW Inc., Cleveland, Ohio, a corporation of Ohio Filed May 11, 1966, Ser. No. 549,210
3 Claims. (Cl. 85—8.3)

ABSTRACT OF THE DISCLOSURE

A cotter pin especially adapted for machine feeding formed of a single strip of metal bent sharply at its midpoint to form a headless lead in portion. Legs extend out from the lead in portion and diverge from each other for a portion at one angle and for a second portion at a greater angle and then flare out to provide anchor-like nut gripping tails. The strip of metal has a rectangular cross-section with planar sides which engage the planar walls of a slotted nut slot to prevent twisting of the pin.

The present invention relates to a cotter pin, a cotter pin in locking combination with a slotted or castled nut and bolt, and the novel method of forming the cotter pin with a slotted or castled nut and bolt section into such a locking combination.

A conventional cotter pin is a split pin formed by doubling a piece of wire, semicircular in cross-section, to form a loop at one end. After insertion into a hole or slot in a nut and through a mating crosswise hole in a bolt, the ends of the pin are conventionally separated and bent to hold it in place. The conventional fasteners are considered not to be adaptable to quick assembly but are widely used in locations where service inspection is difficult and where failure would be disastrous. One difficulty found in conventional cotter pin fasteners is what is termed "chucking," or the wear and eventual failure of the pin due to relative wearing movement between the pin and the slot or edge side of the nut.

SUMMARY

The present invention overcomes these deficiencies in the prior art by providing a headless cotter pin of rectangular cross-section. The pin has a lead in portion from which two legs extend. The legs diverge from each other out from the lead in portion for a distance at a first angle and then for a distance at a second angle greater than the first angle. The ends of the legs then flare out to form anchor like tails adapted to engage a portion of the circumference of a multi-sided nut. When assembled in a slotted nut and holed bolt the planar sides of the rectangular cross-section pin mate with the planar sides of the nut slots to prevent twisting of the pin with respect to the nut and bolt.

It is an object of this invention to provide a new and improved cotter pin and novel method of inserting and forming a new and improved cotter pin-bolt-nut-locking combination that is adapted for quick assembly.

It is a further object of this invention to provide such a cotter pin while maintaining all the advantages of previous cotter pins and further providing additional advantages.

It is a further object of the present invention to provide a novel cotter pin-nut-bolt combination in which chucking or wear of the cotter pin, due to the inner-action or motion of the pin relative to the slot or hole of the nut and bolt is materially reduced.

Another object of the invention is to provide a new and improved cotter pin which is easy to assemble and economical to use.

The organization and manner of operation of the invention, together with further objects and advantages thereof, may best be understood by reference to the following description taken in connection with the accompanying drawing, in the several figures of which like reference numerals identify like elements, and in which an exemplification of the invention is illustrated.

FIG. 1 is a top plan view of a cotter pin according to the present invention including a broken out portion showing the cross-sectional configuration of part of the cotter pin;

FIG. 2 is a top plan view of the cotter pin of FIG. 1, partly within a nut and bolt section illustrating one step in the method of forming the cotter pin-nut-bolt section locking combination in accordance with the present invention;

FIG. 3 is a view similar to FIG. 2 showing the cotter pin with the nut and bolt section in the final or locking combination according to the present invention;

FIG. 4 is a side elevational view of the cotter-nut-bolt section pin locking combination of FIG. 3;

FIG. 5 is a side elevational view with parts broken away to show interior parts of a nut-bolt section assembly juxtaposed to an apparatus for holding and inserting the cotter pin illustrating a mechanism for accomplishing one step of the process of forming the cotter pin-nut-bolt section locking combination;

FIG. 6 is a view similar to that of FIG. 5 showing a later step in the method of forming the cotter pin-nut-bolt section locking combination; and FIG. 7 is a finished view of the cotter pin-nut-bolt section locking combination of FIGS. 5 and 6 also depicting one specific useful application of the invention, that of a steering linkage.

Referring now to FIG. 1, there is depicted a cotter pin constructed in accordance with the present invention and generally indicated by the numeral 10. The cotter pin 10 is formed to be symmetrical about a central cotter pin axis 11. The cotter pin 10 is formed of a unitary strip of metal and bent at its middle point 12 to form a front or lead-in portion. From the portion 12, the cotter pin 10 extends in two legs generally designated 13 and 13' on opposite sides of the axis 11. Unlike the common cotter pin it is formed with a generally rectangular cross-section having generally flat outwardly facing side walls 15, 15 and interior walls 16, 16'. The cotter pin 10 does not have the conventional looped head and is essentially headless having the central bend 12 forming the front end. The cotter pin 10, as seen from the broken-out portion is thicker in its dimension normal to the plane of the cotter pin 10. The legs 13, 13' extend from the portion 12 in slightly diverging straight portions 14, 14' which are shaped into a sharp V with its point at 12. The leg portions 14, 14' terminate at outward bends 17, 17 opposite each other from which the legs 13, 13' diverge from the axis 11 at a greater rate forming a section 18 or 18' which merges at a third bend 19 or 19'. The legs 13, 13' at the bends 19, 19' are turned about 90° outward and extend for a short straight section 20, 20' to another bend 21, 21' of approximately 45° from which they proceed forward in another straight section 22, 22' to respective crimped ends 23, 23'. The sections 20, 20' and 22, 22' form outwardly bent flared holding ends. Thus, the cotter pin 10 is formed with legs 13, 13' arranged in a generally anchor shape.

Referring now to FIG. 2, there is depicted the cotter pin 10 during the first step of its insertion in the mating slotted head nut 24 threaded on a conforming bolt or bolt section 25 having a crosswise hole 25' for receiving the cotter pin 10. A slotted nut is depicted, however, a castled nut could, of course, also be used, and hereafter the terms for the purpose of this application will be considered the same. The nut is conventionally formed with a number of slots 24' each centered in the wall section *24a* and having parallel oppositely disposed slot side walls *24b* terminating at the wall sections *24a* in edges *24c*. As here depicted the pin 10 has entered to approximately the point or bend 17, 17'. The general interrelation between the various sections of the cotter pin 10 are important for the proper functioning of the cotter pin in the nut 24 and bolt section 25. In this regard it should be noted that the extent of the portions 14, 14' is approximately equal to, or slightly less than the length of the slot 24'. The outer side walls 15 of the pin 14 are formed of a generally planar configuration and thus mate with and slide against the planar side walls *24b* of the slot *18a* as the pin head 13 moves within the slot 24' and hole 25' of the bolt section 25, and the nut 24. The gradual V spreading portion to the point 17 produces a greater uncompressed crosswise displacement between the walls 15, 15' in the area of bend 17, 17' than the width between the slot edges *24c*. Thus the walls 15, 15' make contact with the edges *24c* and the side walls *24b*. As the pin head moves through the slot 24', further progress of the pin 10 within the hole slot forces the compression or lateral biasing of the two legs 14, 14' of the cotter pin 10 together, thus forcing or maintaining the flat sides 15, 15' of the pin 10 in contact and under bias against the walls *24b* of the slot 24'. It should be noted that even though somewhat displaced toward one another the inside side walls 15, 15' of the cotter pin 10 are still separated by a small distance in the neighborhood of the bends 17, 17' in FIG. 2.

As further depicted in FIGS. 3 and 4, as the cotter pin 10 is advanced further into the hole, the greater divergence of the portions 18, 18' provides even greater lateral compression of the member, and as the head portion 12 is bent upward out of the nut portion 24 it overlies the bolt portion. Thus according to the present invention a cotter pin-nut-bolt section combination 9 is formed. As best depicted in FIG. 3, at the bends 17, 17 the side walls 16, 16' are juxtaposed and touching.

The center portion of the bent portion of portion 14, 14' is caused to be spread apart at 26 with a separation between the walls 16, 16' and the outer walls 17, 17' compressed against opposite side walls *24b* of the slot 24'. It should be noted that the length of the sections 18, 18' is approximately one-half or slightly less of the length of the slot 24' so as to have the bend portions 17, 17' meet approximately half way between the contact points between sections 18, 18' and edges *24c* on the one end of the slot 24' and the slot side walls *24b* at the other end of the slot 24'. In this configuration, the cotter pin 10 forms a tight binding smooth surface at the areas of contact with the nut *24b* and thus prevents the movement of the pin relative to the nut or "chucking" during use and materially reduces the wear at these points as well as maintaining the nut in more securely on the bolt section 25. As also seen in FIG. 3, the conforming anchor-like side portion of the pin is conformed in configuration to the hexagon edge portions *24a* on either side of the slot portion 24' to mate therewith. As best shown in FIG. 4, the end portion 12 is bent into a semicircular shape to overlie the top of the bolt portion 25 and to lock the pin in the slot 24' and hole 25'.

Referring now to FIG. 5, there is illustrated an apparatus for forming the pin fastener in accordance with the method of the present invention. The apparatus includes an anvil or backing member 40 rigidly affixed to a backing wall 41 as by a bolt 42. The member 40 has a conforming portion 43 for mating with the nut and bolt to have a cotter pin 10 inserted in accordance with the present invention. An extending protrusion 41 on the portion 43 which is formed to be inserted within the slot of the bolt when the bolt and nut are positioned in the anvil 20 in the proper relationship as shown. The portion 44 is an extension of a generally curving semicircular-shaped pin receiving and forming backing portion 45. A cotter pin gun 56 having a sliding piston 57 driven by air pressure and affixed in a guiding portion 58 is provided. For capturing the cotter pin 10 in the gun 56 a slot 59 is formed in the portion 57 of generally conforming shape to the rear portion of the pin 10. The gun 56 serves to align the pin 10 into the slot 24' and hole 25' and to move the pin 10 therein. The cotter pin 10 is forced by the sliding motion of the piston 57 into and through the slot 24' and the hole 25'. The pin 10 moves into the slot hole until its leading part 12 strikes against the curving surface of the projection 44, as best depicted in FIG. 6, and the portions 14, 14' of the cotter pin 10 are bent upwards in conformity to the semicircular section 45 of the anvil 40. The finished cotter pin and the anvil are shown at FIG. 7, on which the cotter pin portion 12 is now facing in an opposite direction and overlying the top and the anchor-like members of the pin positioned as shown in FIGS. 3 and 4.

The particular environment of the cotter pin-nut-bolt section locking combination of FIG. 7 is that of a ball joint socket assembly for a steering linkage for an automobile or the like such as the linkage described in the patent to E. Hedges, Patent No. 3,059,950. In applications such steering linkages are particularly adaptable for cotter pins as the result of failure in this environment might result in great damage. However, to form a proper pin fitting has been a difficulty in the prior art and time-consuming. According to the present invention, the gun 56 may be provided for rapid formation of the novel cotter pin-nut-bolt section combination. It should be noted that the anvil 20 in general has a conforming shape such as to mate with and easily receive the ball joint socket assembly 62. Once the assembly 62 is positioned on the anvil 20 with the hole 25' and slot 24' aligned with the protruding portion 44, the gun 56 bearing the cotter pin 10 need only be manually placed adjacent to the bolt 24 and the cotter pin projecting therefrom can be placed in the position of FIG. 5. Thereafter the simple release of air pressure may drive the cylinder 57 and the cotter pin 10 into its locking combination with the nut and bolt as shown in FIG. 7. The process may be quickly repeated with another assembly 62 and is especially adapted to mass production.

It should be noted that the cotter pin wing anchor-like assembly prevents override or over-projection of the cotter pin within the cotter pin slot in the hole of the nut bolt assembly. The crucial relationship being the offset distance between the portion 17 and the portion 19 which should correspond to approximately slightly less than half of the length of the slotted hole combination. For removing the cotter pin 10 after assembly the leg portions formed of the portions 20, 20', 22, 22' would be bent together and the pin moved in the same direction as it was when it was inserted, out through the slot end in which the part 13 was bent. It should also be noted that in some applications, the portion head 12 need only be extended to roughly a 90° angle or quarter turn so as to lie aside the bolt while in other applications it would be preferable to turn the head downward.

It will be understood that various modifications may be suggested by the embodiment disclosed, but I desire to claim within the scope of the patent warranted hereon all such modifications as come within the scope of my invention.

I claim as my invention:

1. A cotter pin for use in connection with a nut having pin-receiving slots with the slots having planar opposed side walls and the nut having a polygonal circumference, the pin comprising:
  - a unitary strip of metal,
  - a sharp bend centrally of said strip forming a lead in portion,
  - two legs extending from said lead in portion,
    - said legs symmetrical about a central axis,
    - first portions of said legs gradually diverging from said lead in portion, second portions contiguous to said first portions, said second portions diverging at a sharper angle than said first portions, reverse bend flared portions contiguous to said second portions, said flared portions having configurations adapted to mate with at least a portion of the polygonal circumference of the nut, and said legs having a rectangular cross-section providing opposed planar faces to mate with the opposed side walls of the nut slots to restrict twisting of the pin in the pin-receiving slots.

2. In combination:

a nut having pin receiving slots through the wall thereof, said slots having opposed planar side walls, said nut having a polygonal circumference, a bolt section portion threaded into said nut, said bolt section portion having a cotter pin receiving hole therethrough, each of the ends of said hole communicating with one of said slots, a cotter pin received through said hole and communicating slots, said cotter pin constructed of a unitary strip of metal having a sharp bend centrally of said strip forming a lead in portion, two legs extending from said lead in portion, said legs symmetrical about a central axis, first portions of said legs gradually diverging from said lead in portion, second portions contiguous to said first portions, said second portions diverging at a sharper angle than said first portions, reverse bend flared portions contiguous to said second portions, said flared portions having configurations adapted to mate with at least a portion of the polygonal circumference of the nut, said legs having a rectangular cross-section providing opposed planar faces, the said second portions having an angle of divergence such that in its normal state the portions of said second portions adjacent the flared portions have outside surfaces separated a distance greater than the diameter of the hole and greater than the width of the slots whereby with said pin received through said hole and communicating slots the said second portions are compressed towards each other by the opposed planar walls of one of the said slots and the points of contiguance between the first portions and the second portions are pressed against each other causing the first portions to be spread apart away from the contacting contiguance points causing portions of the said planar faces of the first portions to mate with the opposed planar side walls of one of the said communicating slots, portions of the planar faces of the said second portions mating with and compressed by the opposed planar walls of the other of said communicating slots, and the lead in portion and a portion of said first portion extending beyond the said nut and bent away from said axis to lock said pin with said nut and bolt section.

3. In combination:

a nut having pin-receiving planar sided slots through the walls thereof and a multi-sided polygonal circumference, a bolt section portion threaded in said nut having a bore therethrough communicating with two of said slots, a cotter pin received through said two slots and said bore, said cotter pin formed from a single strip of metal and having a lead in portion from which two legs extend, the said legs being symmetrical to the axis of the said bore, said lead in portion formed from a sharp bend of said strip of metal, said legs having first portions diverging in a sharp V-shape with the point of the said V at the said lead in portion, second portions contiguous with said first portions flared outwardly at a sharper angle to the axis than the first portions, outwardly bent flared holding ends contiguous to the said second portions and generally transverse to the axis, the lead in portion and a portion of the first portions extending beyond the bolt section portion and bent away from the axis with a portion of the bend in one of said two slots, the holding ends having a configuration adapted to mate with a portion of the circumference of the nut, said metal strip having a generally rectangular cross-section and opposed planar sides, and the opposed planar sides of the said portion of the bend in the said one slot mating with the planar sides of the said one slot to restrict twisting of the pin in the slot and bore.

References Cited

UNITED STATES PATENTS

| | | | |
|---|---|---|---|
| 1,621,346 | 3/1927 | Beatty | 85—8.1 |
| 1,725,700 | 8/1929 | Cody et al. | 85—8.1 |
| 2,401,976 | 6/1946 | Simpson | 85—8.3 |

FOREIGN PATENTS

| | | |
|---|---|---|
| 289,678 | 5/1928 | Great Britain. |
| 556,551 | 2/1957 | Italy. |

CARL W. TOMLIN, *Primary Examiner.*

R. S. BRITTS, *Assistant Examiner.*